United States Patent
Bampton et al.

(10) Patent No.: US 8,079,126 B2
(45) Date of Patent: Dec. 20, 2011

(54) FRICTION STIR WELDED BLADDER FUEL TANK

(75) Inventors: Clifford C. Bampton, Thousand Oaks, CA (US); Mark Lee Bright, Moorpark, CA (US)

(73) Assignee: Pratt & Whitney Rocketdyne, Inc., Canoga Park, CA (US)

(*) Notice: Subject to any disclaimer, the term of this patent is extended or adjusted under 35 U.S.C. 154(b) by 907 days.

(21) Appl. No.: 12/011,369

(22) Filed: Jan. 25, 2008

(65) Prior Publication Data
US 2009/0188109 A1 Jul. 30, 2009

(51) Int. Cl.
*B21D 39/02* (2006.01)
*B65D 88/12* (2006.01)

(52) U.S. Cl. ....... 29/463; 29/890.01; 220/562; 220/564; 60/39.48; 228/112.1

(58) Field of Classification Search ............... 29/890.01, 29/463; 220/530, 560.07, 562, 564; 60/39.48; 228/112.1
See application file for complete search history.

(56) References Cited

U.S. PATENT DOCUMENTS

| | | | | |
|---|---|---|---|---|
| 2,092,490 A | * | 9/1937 | Zerbe | 220/553 |
| 2,986,004 A | * | 5/1961 | McKenney | 60/243 |
| 3,013,388 A | * | 12/1961 | Loughran | 60/39.462 |
| 3,339,803 A | * | 9/1967 | Wayne et al. | 222/95 |
| 3,426,529 A | * | 2/1969 | Kircher et al. | 60/39.48 |
| 3,494,513 A | * | 2/1970 | Bauer | 222/386.5 |
| 3,615,999 A | * | 10/1971 | Basier et al. | 156/172 |
| 4,117,866 A | * | 10/1978 | Bohm et al. | 138/30 |
| 4,335,751 A | * | 6/1982 | Sugimura et al. | 138/30 |
| 4,437,590 A | * | 3/1984 | LaBruna | 222/386.5 |
| 4,561,568 A | * | 12/1985 | Hoffmeister et al. | 222/130 |
| 4,595,037 A | * | 6/1986 | LeBreton et al. | 138/30 |
| 4,946,056 A | * | 8/1990 | Stannard | 220/584 |
| 5,042,365 A | * | 8/1991 | Rosman | 92/192 |
| 5,085,343 A | * | 2/1992 | Scarr | 220/560.1 |
| 5,117,873 A | * | 6/1992 | Miyakawa et al. | 138/30 |
| 5,176,178 A | * | 1/1993 | Schurter et al. | 138/30 |
| 5,375,325 A | | 12/1994 | Bales et al. | |
| 5,383,566 A | * | 1/1995 | Johnson | 220/562 |
| 5,386,628 A | | 2/1995 | Hartman et al. | |
| 5,407,092 A | * | 4/1995 | Hardgrove et al. | 220/590 |
| 5,460,317 A | | 10/1995 | Thomas et al. | |
| 5,758,795 A | * | 6/1998 | Johnson | 220/564 |

(Continued)

OTHER PUBLICATIONS

G. J. Grant, et al., "E. Friction Stir Joining and Processing of Advanced Materials Including Metal Matrix Composites" from *High Strength Weight Reduction Materials, FY 2004 Progress Report*, pp. 85-94 (2004).

(Continued)

*Primary Examiner* — Essama Omgba
(74) *Attorney, Agent, or Firm* — Kinney & Lange, P.A.

(57) ABSTRACT

A method of fabricating a rolling bladder propellant tank assembly includes providing a pair of half-domes comprising a nanophase metallic material and a bladder formed of a ductile metallic material. A bladder support ring extends from at least one of the pair of half-domes. The pair of half-domes are positioned together to form a cavity therein with a portion of the bladder trapped between the pair of half-domes adjacent to the bladder support ring, wherein the bladder is positioned within the cavity. A seal is formed between the pair of half-domes and the bladder by friction stir welding. A friction stir welding pin used to form the seal is aligned with the bladder support ring during the friction stir welding operation.

19 Claims, 4 Drawing Sheets

U.S. PATENT DOCUMENTS

| | | | |
|---|---|---|---|
| 6,129,236 A * | 10/2000 | Osokin et al. | 220/723 |
| 6,199,717 B1 * | 3/2001 | Tsai | 220/723 |
| 6,401,966 B2 * | 6/2002 | Tsai | 220/723 |
| 6,422,514 B1 | 7/2002 | Clark et al. | |
| 6,499,287 B1 * | 12/2002 | Taylor | 60/204 |
| 6,660,106 B1 | 12/2003 | Babel et al. | |
| 6,745,983 B2 * | 6/2004 | Taylor | 244/135 R |
| 6,840,426 B2 | 1/2005 | Aota et al. | |
| 6,848,163 B2 | 2/2005 | Bampton et al. | |
| 6,902,699 B2 | 6/2005 | Fritzemeier et al. | |
| 7,093,470 B2 | 8/2006 | El-Soudani | |
| 7,097,807 B1 | 8/2006 | Meeks, III et al. | |
| 7,111,653 B2 * | 9/2006 | Cnossen et al. | 141/351 |
| 7,195,133 B1 * | 3/2007 | Cundiff et al. | 220/589 |
| 7,389,890 B1 * | 6/2008 | Hampsten | 220/560.07 |
| 2004/0118855 A1 * | 6/2004 | Calabro | 220/560.08 |
| 2005/0147520 A1 * | 7/2005 | Canzona | 419/66 |
| 2006/0198754 A1 * | 9/2006 | Bampton et al. | 419/28 |
| 2007/0039366 A1 | 2/2007 | Michel et al. | |
| 2009/0206111 A1 * | 8/2009 | Conrardy et al. | 222/386.5 |

OTHER PUBLICATIONS

M.B. Henderson, et al., "Nickel-Based Superalloy Welding Practices for Industrial Gas Turbine Applications" from *Science and Technology of Welding and Joining*, 13 pages (2004).

* cited by examiner

FRICTION STIR WELDED BLADDER FUEL TANK

BACKGROUND

The present invention relates to bladder propellant (or fuel) tank assemblies and manufacturing methods.

Propellant tanks with internal bladders are frequently utilized in aerospace applications, particularly for use with rocket engines for space vehicles. In general, these bladder propellant tanks store propellant (e.g., hydrazine) to one side of the internal bladder, and can admit a pressurized gas (e.g., helium) at the other side of the internal bladder to force the propellant out of the tank through an outlet port. These bladder propellant tanks can be formed from two aluminum or titanium half-domes welded together. The process typically used to weld the two half-domes together involves making three electron beam (EB) welds. However, it is desired to provide an assembly and manufacturing method that does not require electron beam welding while providing a bladder tank at lower cost and with less weight.

SUMMARY

A method of fabricating a rolling bladder propellant tank assembly includes providing a pair of half-domes comprising a nanophase metallic material and a bladder formed of a ductile metallic material. A bladder support ring extends from at least one of the pair of half-domes. The pair of half-domes are positioned together to form a cavity therein with a portion of the bladder trapped between the pair of half-domes adjacent to the bladder support ring, wherein the bladder is positioned within the cavity. A seal is formed between the pair of half-domes and the bladder by friction stir welding. A friction stir welding pin used to form the seal is aligned with the bladder support ring during the friction stir welding operation.

DETAILED DESCRIPTION

In general, the present invention provides a bladder propellant (or fuel) tank apparatus and assembly method that includes friction stir welding a joint between a bladder and two half-domes that each comprise a nanophase alloy. A bladder support ring extends from one of the half-domes. The bladder support ring can be shaped to help induce the bladder to roll along an interior surface of a cavity defined by the two half-domes during propellant tank operation. The bladder can comprise a ductile metallic material. A circumferential portion of the bladder is retained at the joint, which comprises a butt joint formed between first and second half-domes and a lap joint formed by the bladder support ring adjacent to the butt joint. A seal is formed between the bladder and the first and second half-domes comprising a friction stir weld nugget between the second half-dome, the bladder and the bladder support ring. During friction stir welding of the joint, a friction stir welding pin used to form the seal is aligned with the bladder support ring, which stiffens the rolling bladder propellant tank assembly such that the friction stir welding pin presses against a center section of the bladder propellant tank assembly without causing deformation damage to the pair of half-domes.

Figure 1:
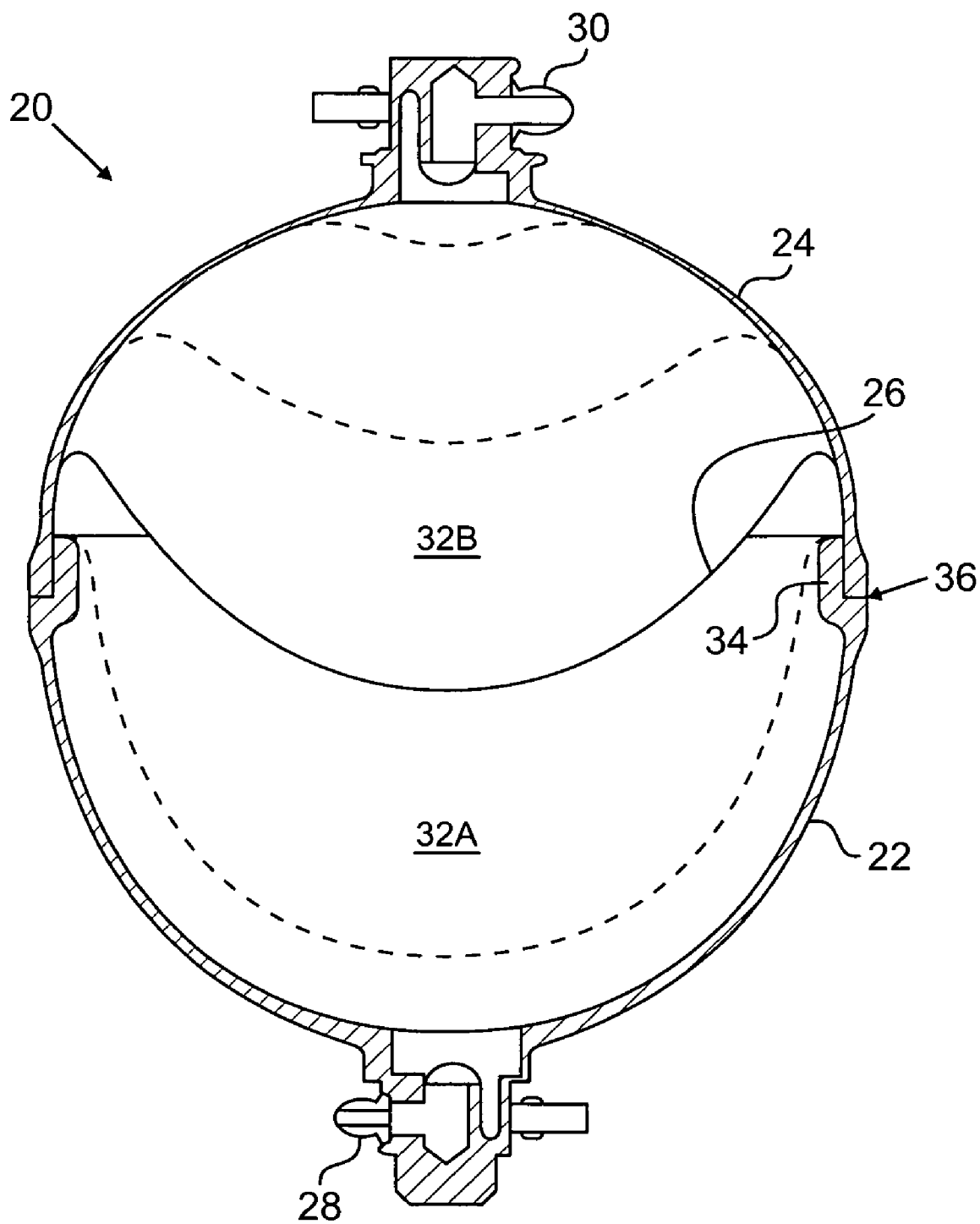
FIG. 1 is a cross-sectional view of a bladder propellant tank assembly according to the present invention.

FIG. 1 is a cross-sectional view of a bladder propellant tank assembly 20 that includes first and second half-domes 22 and 24, respectively, and a bladder (or diaphragm) 26. The first half dome 22 includes an inlet port 28, and the second half-dome 24 includes an outlet port 30. A cavity (collectively referred to by reference number 32) is defined within the two half-domes 22 and 24, with a first volume 32A for pressurized gas (e.g., helium) and a second volume 32B for propellant (e.g., hydrazine). A solid bladder support ring 34 extends from the first half-dome 22. A circumferential joint 36 is formed at a center section of the assembly 20 between the two half-domes 22 and 24, the bladder support ring 34 and the bladder 26. The joint 36 includes a welded seal, as explained in greater detail below.

The bladder 26 can be formed of a ductile metallic material, such as commercially pure aluminum (1100-0 Al). The bladder 26 can include grooves to enhance flexibility and rolling, in a manner well known in the art. A circumferential portion of the bladder 26 is retained at the joint 36.

The first and second half-domes 22 and 24 and the bladder support ring 34 can all be formed from a nanophase metallic material, which can be formed from a cryo-milled metallic powder. In one embodiment, the nanophase metallic material is, by weight, about 7.5% magnesium (Mg), 0.4% nitrogen (N) and the balance aluminum and incidental impurities. In alternative embodiments, other nanophase alloys can be used, such as other aluminum alloys. simple magnesium alloys and other non-aluminum alloys. The nanophase metallic material can have a grain size of about 100 nm to about 400 nm, or alternatively a grain size of less than about 300 nm.

Initially, prior to use, the tank assembly 20 is filled with propellant, and the second volume 32B occupies all or substantially all of the cavity 32. During operation, the pressurized gas is introduced to the first volume 32A through the inlet port 28. Introduction of pressurized gas to the first volume 32A applies force to the bladder 26 to push the propellant out of the second volume 32B through the outlet port 30 for delivery to a desired location. FIG. 1 shows multiple locations of the bladder 26 in phantom, with each location indicating a different volume of propellant in the second volume 32B and a corresponding volume of pressurized gas in the first volume 32A. As the bladder 26 moves within the cavity 32 to displace the propellant, the bladder rolls along interior surfaces of the cavity 32 along the second half-dome 24. For that reason, the bladder 26 is referred to as a "rolling bladder".

Figure 2:
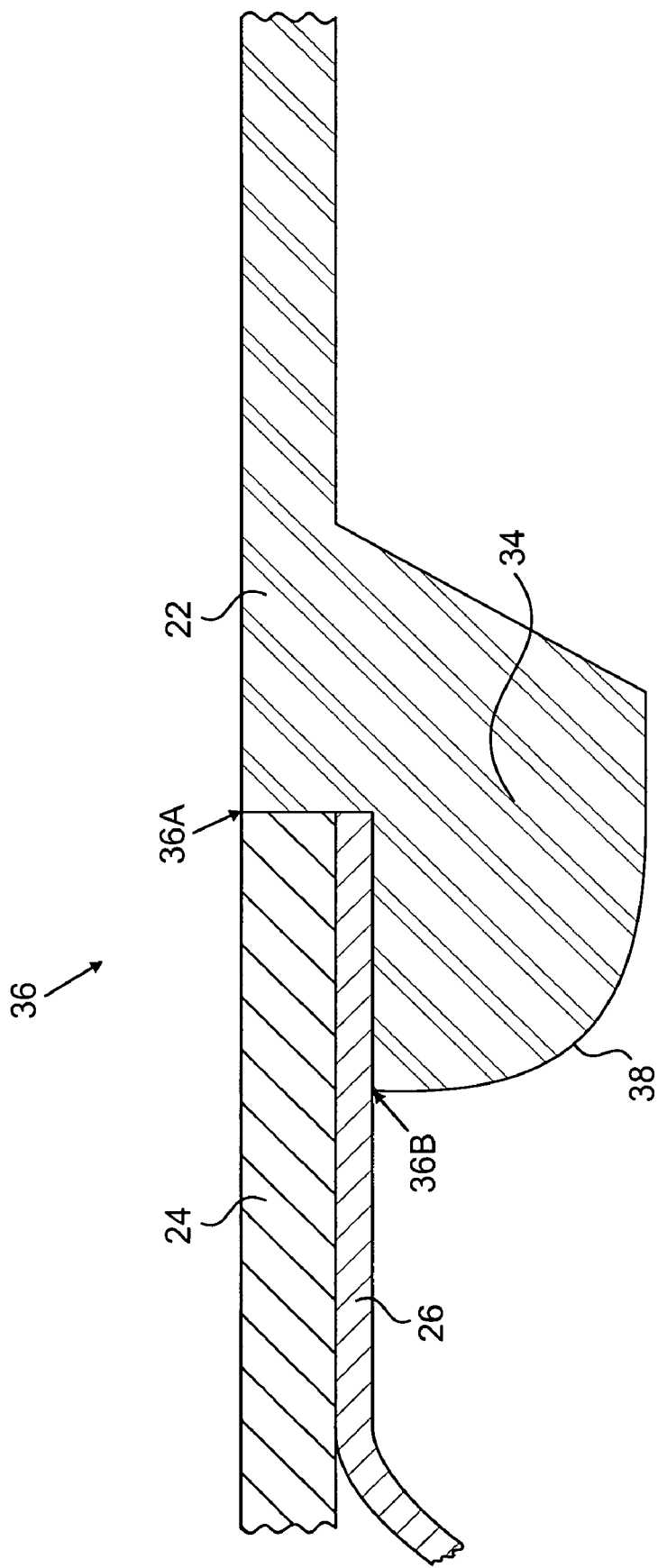
FIG. 2 is a cross-sectional view of a joint of the bladder propellant tank assembly prior to welding.

FIG. 2 is a cross-sectional view of the joint 36 of the bladder propellant tank assembly 20 prior to welding. As shown in FIG. 2, the joint 36 comprises a butt joint 36A formed between first and second half-domes 22 and 24 and a lap joint 36B formed by the bladder support ring 34 adjacent to the butt joint 36A. In the illustrated embodiment, the bladder support ring 34 is integrally formed with the first half-dome 22, although in alternative embodiments the bladder support ring 34 can be a stand-alone piece that is joined to the first half-dome 22 at the butt joint 36A during the welding process. The bladder support ring 34 is shaped to facilitate the bladder 26 rolling along and interior surface of the second half-dome 24 during operation. The special shape of the bladder support ring 34 in the illustrated embodiment includes a curved face 38.

Figure 3:
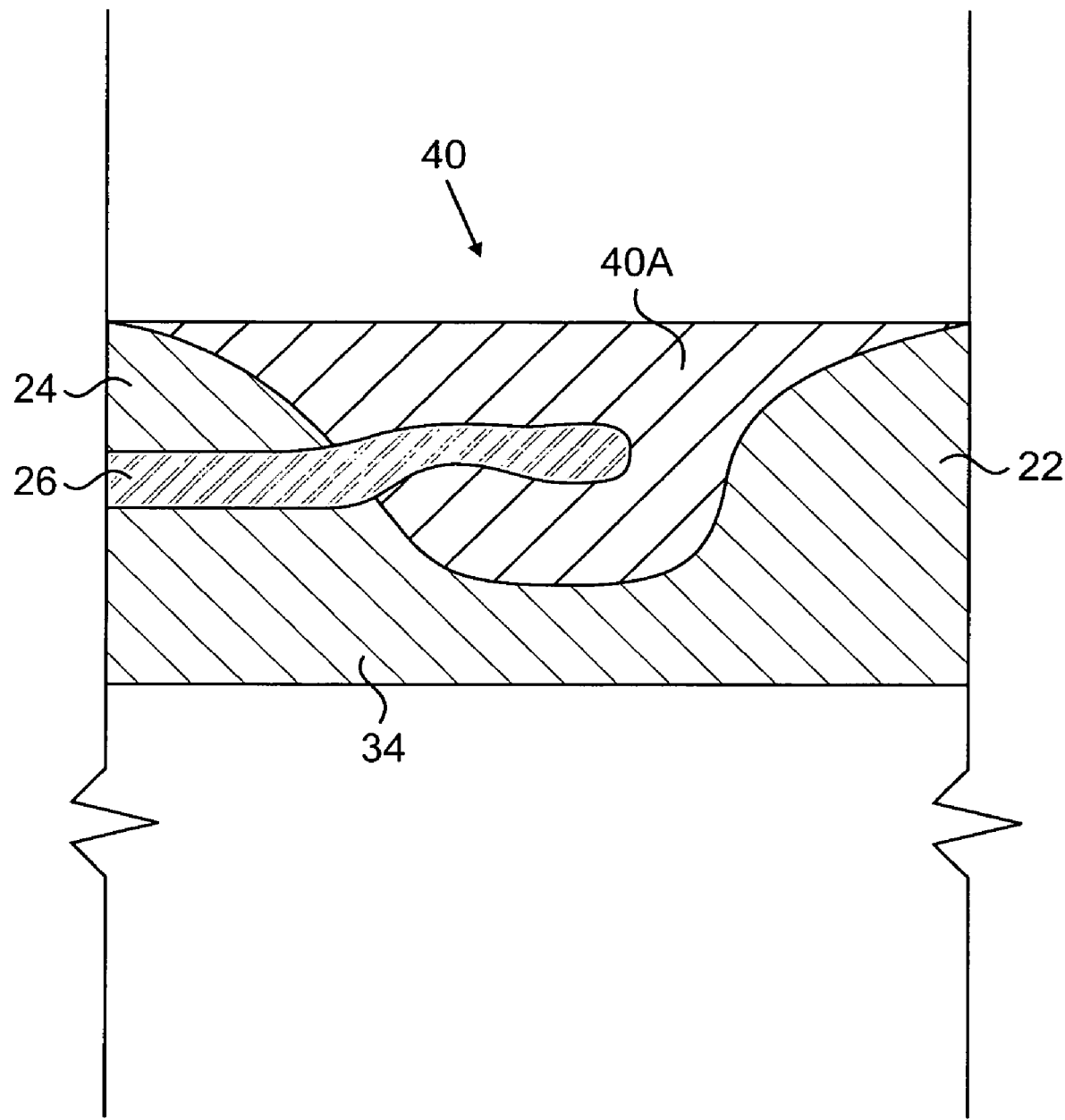
FIG. 3 is a cross-sectional view of the joint after a seal has been formed by friction stir welding.

FIG. 3 is a cross-sectional view of the joint 36 after a seal 40 has been formed by friction stir welding. As shown in FIG. 3, the seal 40 defines a weld nugget 40A formed between the second half-dome 24, the bladder 26 and the bladder support ring 34, which extends from the first half-dome 22. The seal 40 hermetically seals the tank assembly 20, to prevent undesired fluid flow at the joint 36.

Figure 4:
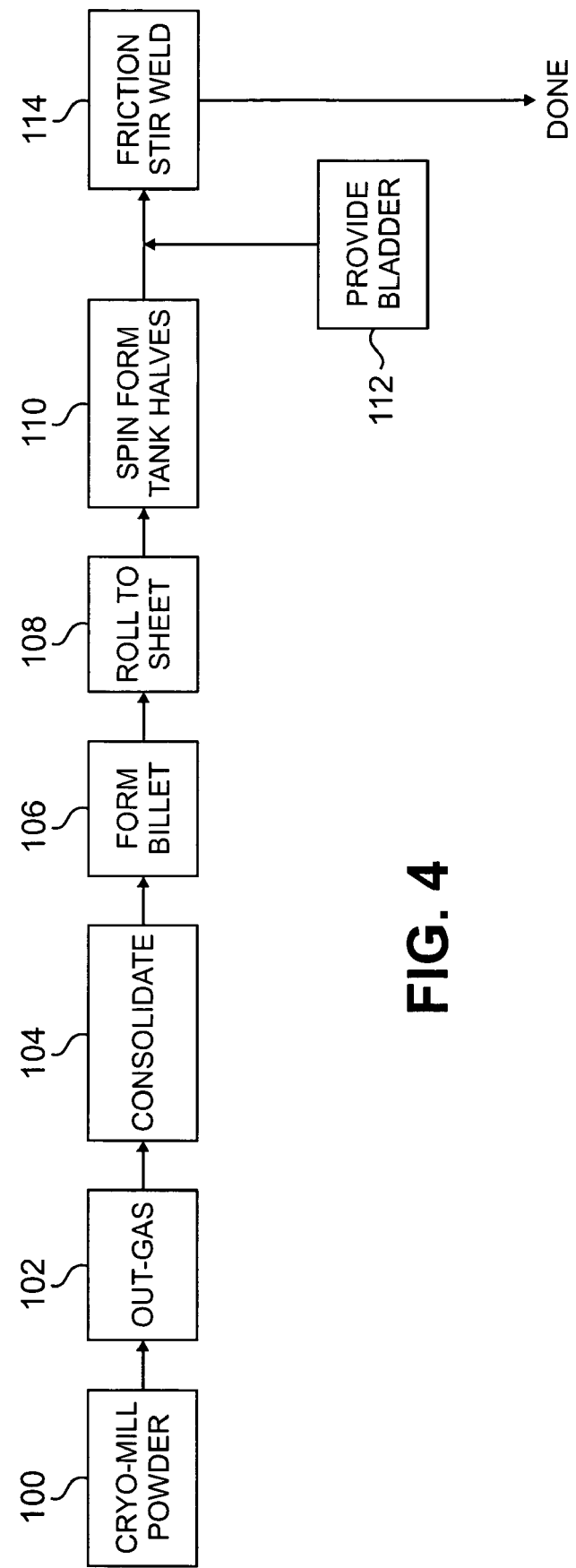
FIG. 4 is a flow chart of a bladder propellant tank manufacturing method according to the present invention.

FIG. 4 is a flow chart of a bladder propellant tank manufacturing method according to the present invention. Initially, a nanophase metallic material is formed as a powder through a cryo-milling procedure (step 100). Cryo-milling (also known as cryogenic milling) is a mechanism that helps to reduce crystalline grain size through an equilibrium of severe deformation, cold welding and fracturing (see, e.g., U.S. Pat. No. 6,902,699). Cryo-milling also involves the intrinsic formation of strengthening and thermally stabilizing dispersoids, such as nitrides, and the optional extrinsic inclusion of a uniform distribution of submicron ceramic particles, such as silicon carbide. A high energy attritor-type ball mill can be used for cryo-milling. Such a ball mill can utilize steel balls placed in a cooled stationary tank, with a rotating impeller to help the steel balls exert force on a metallic material powder placed therein. The cryo-milling procedure can take place in the presence of nitrogen (e.g., liquid nitrogen ($LN_2$)) at a temperature of about $-195.6°$ C. ($-320°$ F.). The nanophase metallic material is produce in a powder form, and can have an average powder particle size of about 40 μm (0.001575 inch).

After the nanophase metallic material powder is formed, the next step is to remove excess gas from the powder through an out-gas procedure (step 102). Then, the powder is consolidated (step 104) and formed into a solid billet (step 106). Billets can be formed through extrusion, vacuum hot pressing, or other known techniques. Billets can then be hot or cold rolled to form sheets of desired thicknesses (step 108). Tank assembly components, such as the half-domes 22 and 24, can then be formed from the rolled material using a known spin-forming process (step 110).

The bladder 26 can be made in a conventional manner, and provided for assembly with the bladder propellant tank assembly 20 (step 112). The bladder 26 is positioned in the cavity 32 with a circumferential portion retained by the joint 36.

The half domes 22 and 24 and the bladder 26 are assembled together to form the joint 36 as described above with respect to FIGS. 1 and 2 and a friction stir welding procedure is performed to create the seal 40 described above with respect to FIG. 3 (step 114). The friction stir welding procedure can utilize a friction stir welding pin that is brought into contact with the assembly 20 to accomplish a solid-state weld. The friction stir welding pin is aligned with the bladder support ring 34 and the butt joint 36A formed between the first and second half-domes 22 and 24 during welding. The nanophase metallic material has relatively high strength and ductility at ambient and cryogenic temperatures and a low friction stir welding "reaction force" relative to other aluminum alloys, such as heat treated 2219 aluminum used with prior art bladder propellant tanks. Moreover, the bladder support ring 34 provides additional stiffness at the joint 36. These features of the present invention allow the friction stir welding pin to press against the assembly 20 without causing undesired deformation of the half-domes 22 and 24 and the bladder support ring 34, and can eliminate the need to temporarily provide additional stiffeners during the friction stir welding procedure. The circumferential friction stir weld at the joint 36 requires a method to avoid leaving a hole when the friction stir welding pin tool is extracted at the end of the weld. This may be achieved by a number of well established methods, including an extractable pin tool method, where the friction stir welding pin is separate from a friction stir welding shoulder and is gradually pulled up in to the shoulder of the tool to avoid leaving a pin-hole. Another well established approach is a secondary friction plugging method, sometimes know as a friction pillar weld, with excess metal from the plug removed by grinding or machining.

The present invention provides numerous advantages. For example, the assembly and manufacturing method of the present invention is relatively low cost and provides repeatable process control with no special operator skill required. These advantages can exceed those for prior art electron beam welding tank manufacturing. Moreover, friction stir welds in nanophase metallic materials can retain fine grain size through a weld nugget, achieve a minimal drop in strength and hardness through the weld nugget, and achieve essentially no drop in strength in a heat affected zone adjacent to the weld nugget, because the nanophase aluminum, unlike all conventional high strength aluminum alloys, does not depend on solution heat treat, water quench and age for its high strength.

Although the present invention has been described with reference to preferred embodiments, workers skilled in the art will recognize that changes may be made in form and detail without departing from the spirit and scope of the invention. For instance, the nanophase metallic material composition can vary as desired for particular applications.

What is claimed is:

1. A method of fabricating a rolling bladder propellant tank assembly, the method comprising:
   providing a pair of half-domes each comprising a nanophase metallic material, wherein a bladder support ring extends from at least one of the pair of half-domes;
   providing a bladder formed of a ductile metallic material;
   defining a shape of the bladder support ring to help induce the bladder to roll along an interior surface of the propellant tank assembly during operation, with the bladder support ring in cross-section including a curved face and a planar face;
   positioning the pair of half-domes together to form a cavity therein with a portion of the bladder trapped between the pair of half-domes adjacent to the bladder support ring with the bladder support ring extending radially inward into the cavity relative to adjacent inner surfaces of the pair of half-domes, wherein the bladder is positioned within the cavity; and
   forming a seal between the pair of half-domes and the bladder by friction stir welding, wherein a friction stir welding pin used to form the seal is aligned with the bladder support ring during the friction stir welding operation, and wherein the friction stir welding pin is spaced from the curved face and the planar face of the bladder support ring during friction stir welding.

2. The method of claim 1 and further comprising:
   cryo-milling a metallic powder; and
   consolidating the cryo-milled metallic powder to form the nanophase metallic material.

3. The method of claim 2, wherein the cyro-milled metallic powder comprises an average powder particle size of about 40 μm.

4. The method of claim 2, wherein the consolidated cyro-milled metallic material is produced in billet form, the method further comprising:
   hot-working the billet to form the pair of half-domes.

5. The method of claim 1, wherein the bladder support ring stiffens the rolling bladder propellant tank assembly such that the friction stir welding pin presses against a center section of the rolling bladder propellant tank assembly without causing deformation damage to the pair of half-domes.

6. The method of claim 1, wherein a grain size of the nanophase metallic material is substantially retained in a weld nugget of the seal.

7. The method of claim 1, wherein there is approximately zero drop in strength of the nanophase metallic material in a heat affected zone of the seal.

8. A rolling bladder propellant tank assembly comprising:
- a pair of half-domes made of a nanophase metallic material, wherein at least one of the pair of half-domes defines a bladder support ring;
- a bladder formed of a ductile metallic material;
- a cavity formed between the pair of half-domes with a portion of the bladder trapped between the pair of half-domes adjacent to the bladder support ring, wherein the bladder is positioned within the cavity, wherein the bladder support ring is shaped to help induce the bladder to roll along an interior surface of the cavity during propellant tank assembly operation, with the bladder support ring configured to define an extension that extends radially inward into the cavity in relation to adjacent portions of the pair of half-domes and that in cross-section includes a curved face and a planar face, wherein the curved face and the planar face are located along the cavity; and
- a seal between the pair of half-domes and the bladder formed by friction stir welding, wherein the bladder support ring extends into the cavity and is thicker than adjacent portions of the pair of half-domes to stiffen the rolling bladder propellant tank assembly such that a friction stir welding pin used to form the seal can be pressed against a center section of the rolling bladder propellant tank assembly in alignment with the bladder support ring without causing deformation damage to the pair of half-domes.

9. The assembly of claim 8, wherein the nanophase metallic material consists essentially of, by weight, 7.5% magnesium, 0.4% nitrogen, and the balance aluminum and incidental impurities.

10. The assembly of claim 8, wherein the ductile material comprises commercially pure aluminum.

11. The assembly of claim 8, wherein the nanophase metallic material has a grain size of less than about 300 nm.

12. The assembly of claim 8, wherein the nanophase metallic material has a grain size of about 100 nm to about 400 nm.

13. A rolling bladder propellant tank assembly comprising:
- a first half-dome comprising a nanophase metallic material;
- a second half-dome comprising the nanophase metallic material, wherein the first and second half-domes are positioned adjacent each other to define a cavity;
- a bladder support ring comprising the nanophase metallic material, wherein the bladder support ring is formed integrally with the first half-dome and extends into the cavity;
- a bladder comprising a ductile material, wherein a circumferential portion of the bladder is retained at a joint that comprises a butt joint formed between the first and second half-domes and a lap joint formed by the bladder support ring adjacent to the butt joint; and
- a seal between the bladder and the first and second half-domes comprising a friction stir weld nugget between the second half-dome, the bladder and the bladder support ring,
- wherein the bladder support ring is shaped to help induce the bladder to roll along an interior surface of the cavity during propellant tank assembly operation, with the bladder support ring configured to define an extension that extends radially inward into the cavity in relation to adjacent portions of the first and second half-domes and that in cross-section includes a curved face and a planar face, wherein the curved face and the planar face are located along the cavity and spaced from the butt joint.

14. The assembly of claim 13 and further comprising:
- a pressurized gas inlet located on the first half-dome; and
- a propellant outlet located on the second half-dome.

15. The assembly of claim 13, wherein the nanophase metallic material comprises an aluminum alloy.

16. The assembly of claim 15, wherein the nanophase aluminum alloy consists essentially of, by weight, 7.5% magnesium, 0.4% nitrogen, and the balance aluminum and incidental impurities.

17. The assembly of claim 13, wherein the ductile material comprises commercially pure aluminum.

18. The assembly of claim 13, wherein the nanophase metallic material has a grain size of less than about 300 nm.

19. The assembly of claim 13, wherein the nanophase metallic material has a grain size of about 100 nm to about 400 nm.

\* \* \* \* \*